United States Patent [19]

Mouissie

[11] 4,354,731

[45] Oct. 19, 1982

[54] SELF-ALIGNING OPTICAL FIBER CONNECTOR

[75] Inventor: Bob Mouissie, Berlicum, Netherlands

[73] Assignee: E. I. Du Pont de Nemours and Company, Wilmington, Del.

[21] Appl. No.: 156,452

[22] Filed: Jun. 11, 1980

Related U.S. Application Data

[63] Continuation-in-part of Ser. No. 78,701, Oct. 2, 1979, abandoned.

[51] Int. Cl.³ .................................................. G02B 5/14
[52] U.S. Cl. ................................. 350/96.21; 350/96.20
[58] Field of Search ................ 343/96.20, 96.21, 96.22

[56] References Cited

U.S. PATENT DOCUMENTS

| 3,948,582 | 4/1976 | Martin | 350/96.20 |
| 3,982,815 | 9/1976 | Nakayama | 350/96.21 |
| 4,155,624 | 5/1979 | Logan et al. | 350/96.20 |
| 4,165,914 | 8/1979 | Villarruel et al. | 350/96.20 |
| 4,198,122 | 4/1980 | Prunier et al. | 350/96.21 |
| 4,205,898 | 6/1980 | Matthews et al. | 350/96.21 |

FOREIGN PATENT DOCUMENTS

| 2628747 | 1/1977 | Fed. Rep. of Germany | ... 350/96.21 |
| 2559448 | 3/1977 | Fed. Rep. of Germany | ... 350/96.21 |
| 52-30447 | 3/1977 | Japan | ................ 350/96.21 |
| 1449156 | 9/1976 | United Kingdom . | |
| 1576459 | 10/1980 | United Kingdom . | |

*Primary Examiner*—David K. Moore

[57] ABSTRACT

An optical fiber connector having two half-round holding members mounted in a central coupler. The half-round members have flat mating surfaces with an opposed longitudinal V-groove for receiving fiber ends of either similar or dissimilar diameters. The opposed fibers spread the holding members away from each other; an elastic member retains the holding members in opposed relationship.

6 Claims, 8 Drawing Figures

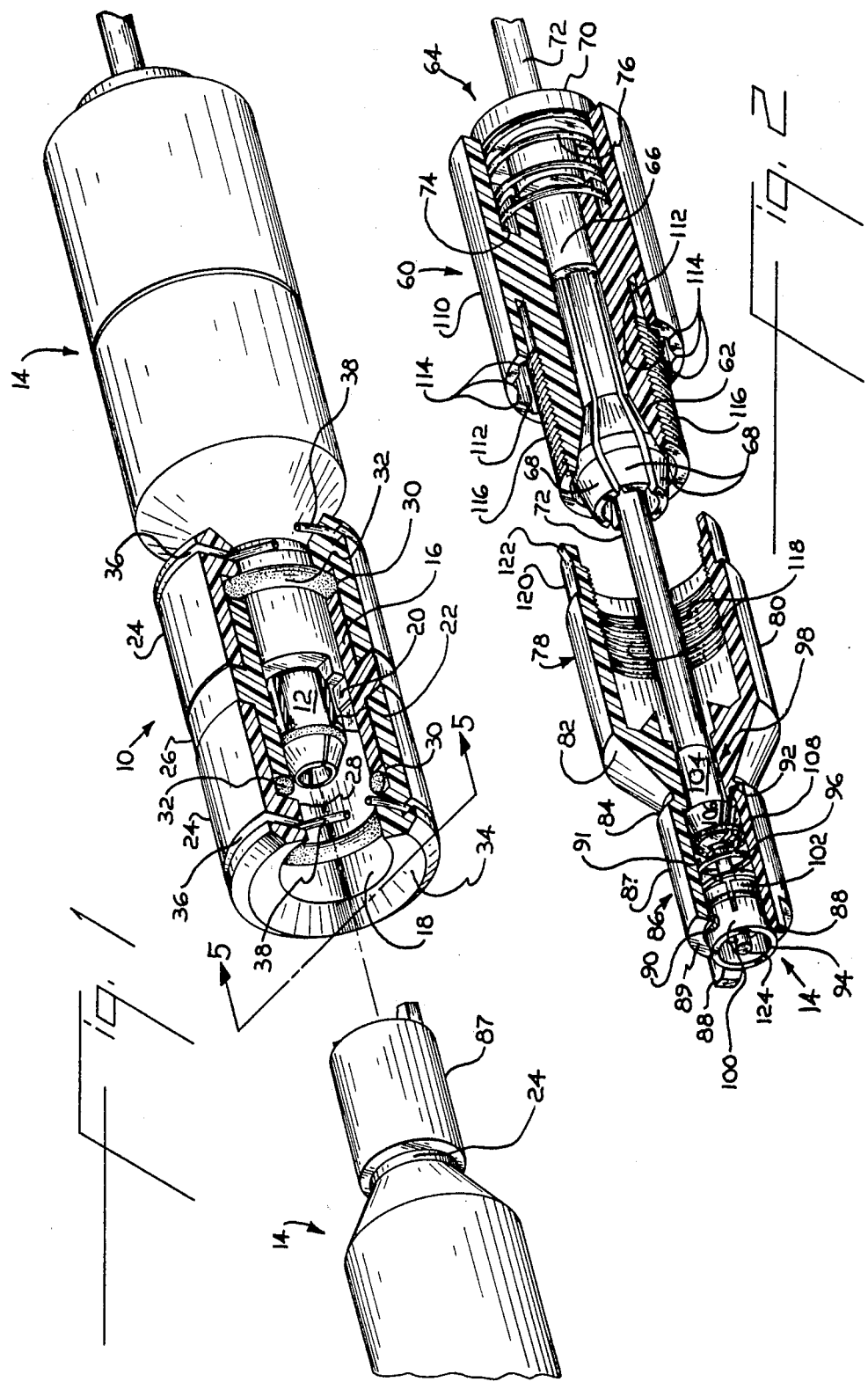

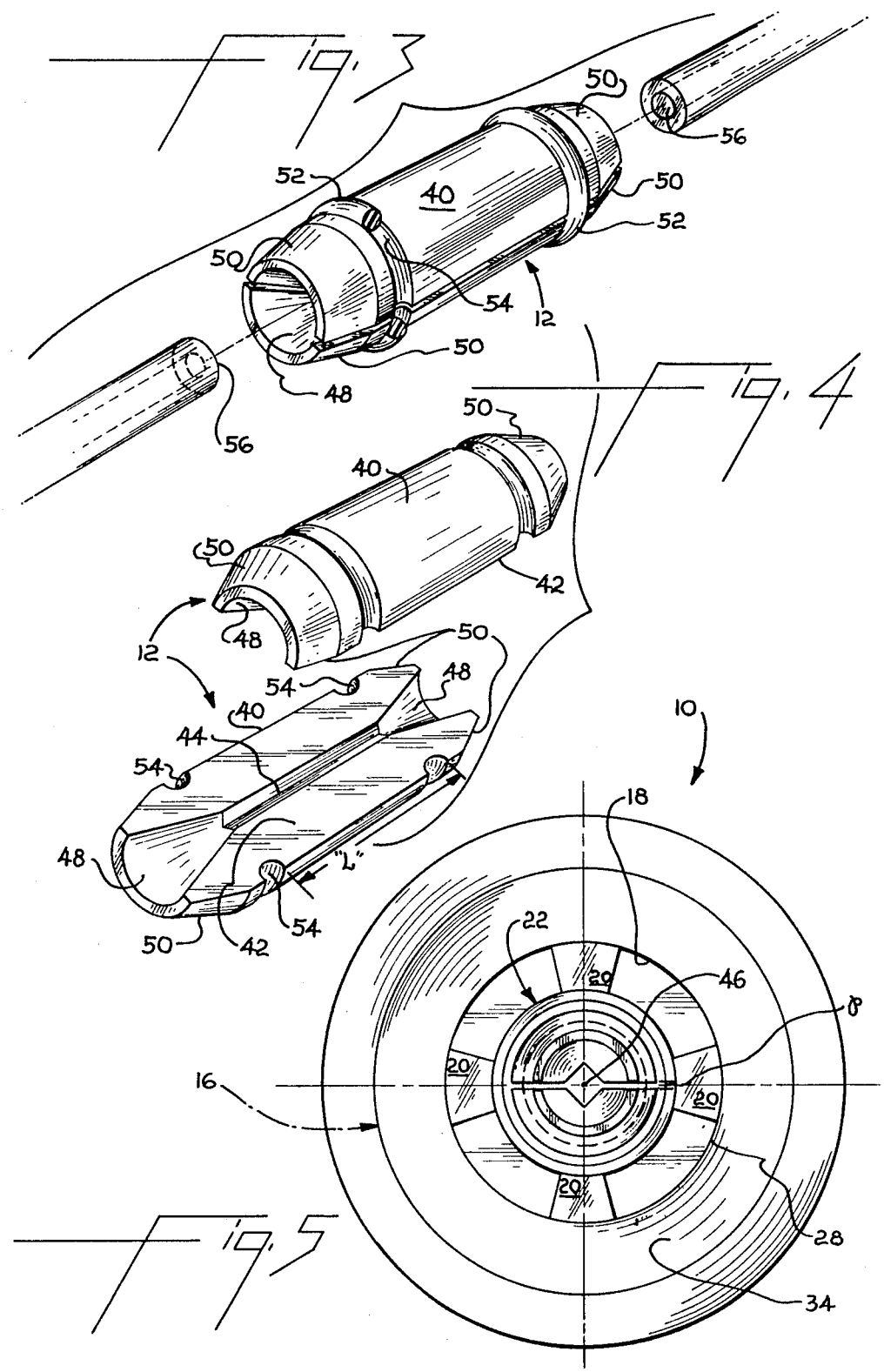

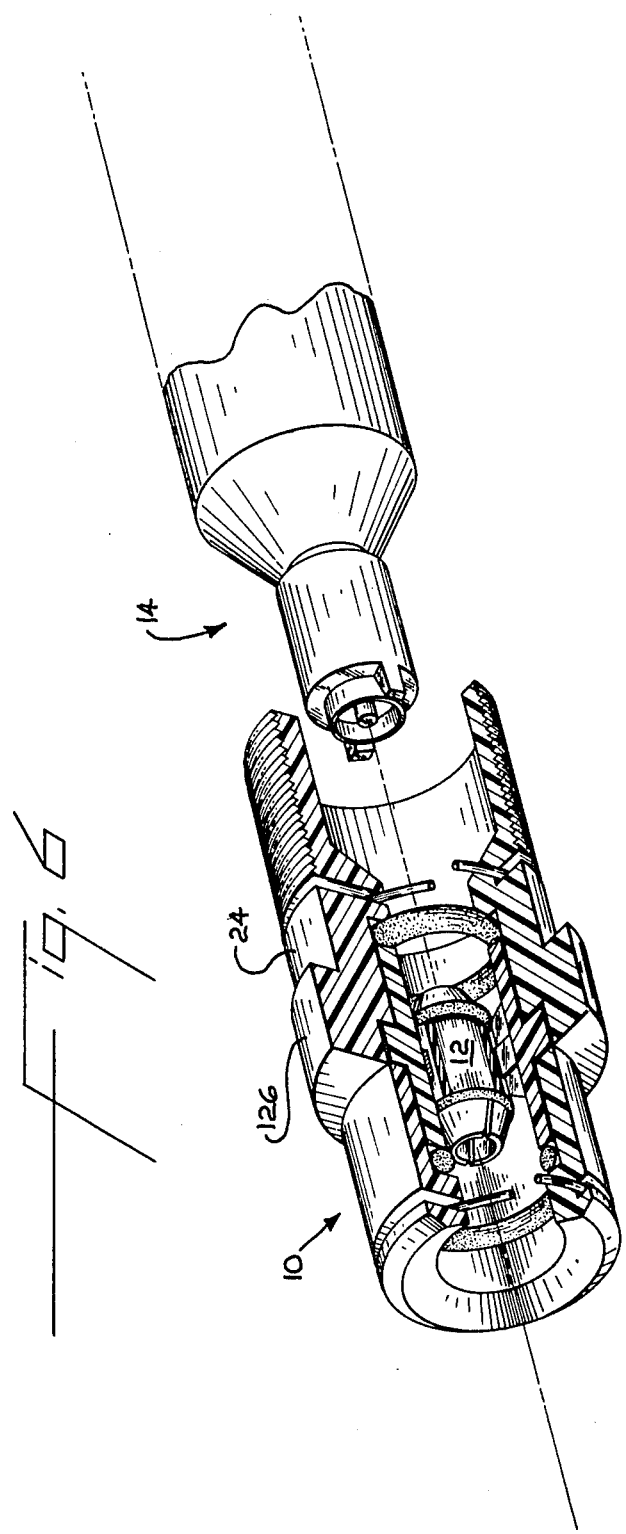

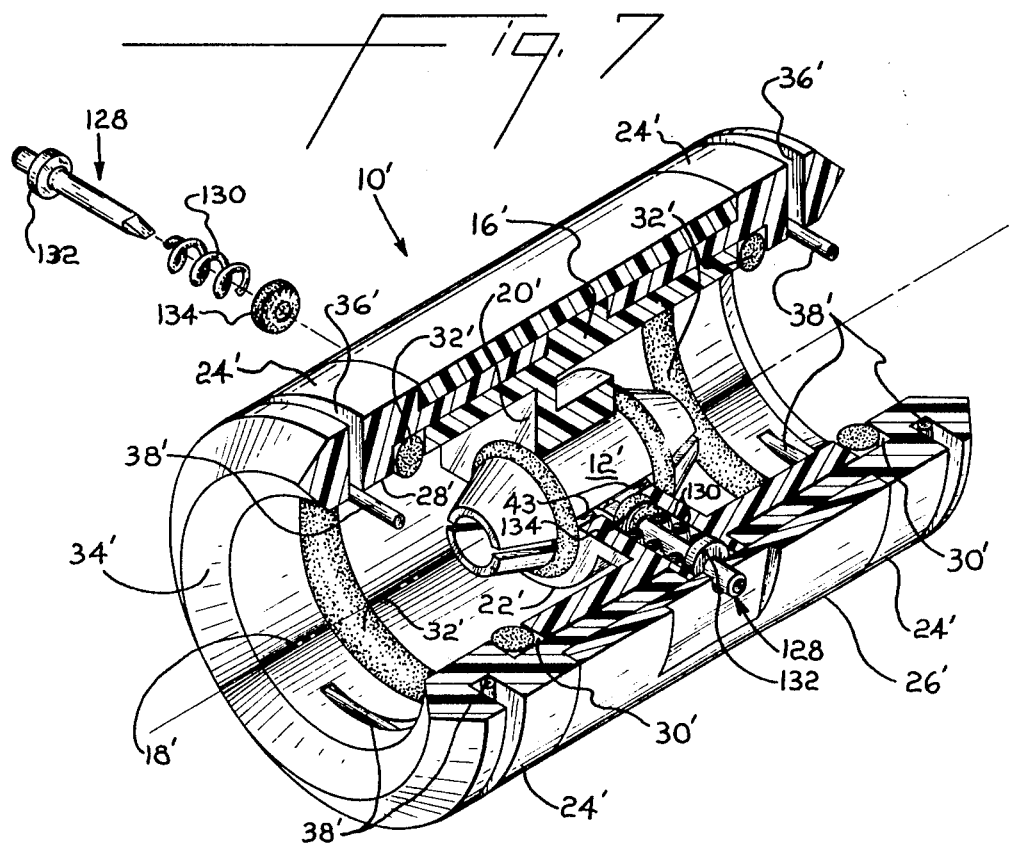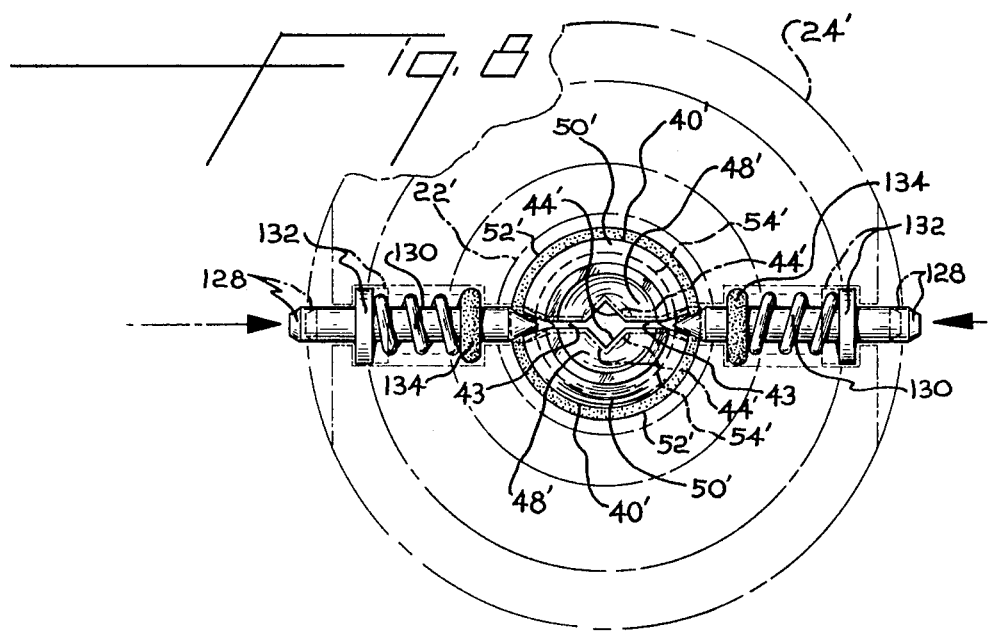

SELF-ALIGNING OPTICAL FIBER CONNECTOR

CROSS REFERENCE TO RELATED APPLICATIONS

This is a continuation-in-part application of U.S. application Ser. No. 78,701, filed Oct. 2, 1979, and now abandoned.

BACKGROUND OF THE INVENTION

This invention relates to an improved optical fiber connector, and more particularly, to a self-aligning optical fiber connector for joining single optical fibers of dissimilar diameters without the need for a coupling fluid.

Joining single optical fibers in a manner which insures the efficient transmission of light or power requires locating the ends of the fibers in precise end-to-end axial relationship. The closer together the prepared square cut end surfaces of two fibers can be brought and aligned on a common centerline without abutting, the less losses will usually occur.

U.S. Pat. No. 3,864,018 discloses a method and means for splicing arrays of uniform diameter optical fibers using a plurality of thin rigid chips having closely spaced parallel fiber receiving grooves in the opposed faces thereof. The chips are particularly suited for splicing a plurality of fibers which are contained, for example, in a fiber ribbon structure. The chips are not practical for use in splicing single optical fibers, particularly fibers having different diameters.

U.S. Pat. No. 3,768,146 teaches a method of splicing optical fibers according to which a pliable metallic sleeve is slipped over the abutting ends of a pair of fibers and then crimped to mechanically secure the fibers. The fibers to be spliced are placed in end-to-end relationship in a V-groove. The metallic sleeve, which must be slipped over the ends of the fiber, is compressed, i.e., crimped, by a compression plate. Relative to alternative methods of splicing fibers, particularly the method disclosed and claimed herein, this method can be unreliable.

SUMMARY OF THE INVENTION

The present invention provides an improvement in an optical fiber connector of the type wherein single fibers are joined in a central coupler which comprises a centering device pivotally mounted in the central coupler. The centering device comprises two slightly elongated half-round holding members, each having a flat surface located in opposed relationship. Each flat surface has an opposed longitudinal V-groove which defines a bore when the flat surfaces are in mating relationship. A conically inclined convergent surface is provided on either end of the bore for receiving and guiding the ends of an optical fiber thereinto. The centering device is mounted in the central coupler so that the axis of the bore formed by the opposed longitudinal V-grooves coincides with the longitudinal axis of the coupler.

A pair of single fibers to be joined are each inserted into a fiber end connector of the type having an elongated cylindrical body with a reduced diameter forward portion and an enlarged rear portion. A retention tube and a fiber guide are provided in the reduced diameter forward portion of the fiber end connector and cooperate to guide the end of a fiber into the bore formed by the opposed V-grooves of the two holding members. The forward portion of the end connectors are inserted into the centeral coupler in opposed relation so that the exposed ends of the fibers are brought into axial alignment in an opposed, slightly spaced relationship in the bore of the centering device.

BRIEF DESCRIPTION OF THE DRAWINGS

For a better understanding of the features and advantages of this invention, reference will be made to the accompanying drawings in which:

FIG. 1 is a partially sectioned perspective view of an embodiment of the improved optical fiber connector of this invention in which the centering device is shown in combination with a central coupler and an end coupler.

FIG. 2 is an exploded perspective view illustrating a section of an optical fiber end connector with a fiber guide and retention tube in the forward portion thereof.

FIG. 3 is a perspective view of the centering device of this invention.

FIG. 4 is an exploded view of the centering device of FIG. 3.

FIG. 5 is an elevation view of a central coupler taken along line 5—5 of FIG. 1.

FIG. 6 is a perspective view, in partial section, of a central coupler having one end adapted for mounting on a panel.

FIG. 7 is a partially sectioned perspective view of a central coupler employing an optional zero insertion force device.

FIG. 8 is an elevation view of the central coupler in FIG. 7 showing insertion of the zero insertion device.

DETAILED DESCRIPTION OF THE INVENTION

Referring now to FIG. 1, there is shown a partially sectioned perspective view of a central coupler 10 in combination with the centering device 12 of this invention and an optic fiber end coupler 14. Central coupler 10 comprises a housing 16 having a generally cylindrical first bore 18. As may be seen in FIG. 5, at least two opposed ribs 20 extend radially into the first bore 18 and terminate in a hub 22 having a hole (not visible) coaxial with first bore 18. Housing 16, including ribs 20 and hub 22, can be molded from any suitable thermoplastic material such as polyethylene.

A pair of sleeves 24 of any suitable material such as stainless steel are mounted on housing 16 in opposed relationship. As shown in FIG. 1, housing 16 includes a circumferential shoulder 26 against which sleeves 24 abut.

Sleeves 24 terminate in an inwardly projecting peripheral edge 28 defining a generally circular opening coaxial with first bore 18. Peripheral edge 28 forms an annular cavity 30 with housing 16 in which is located a resilient O-ring 32 of slightly smaller diameter than first bore 18. The circular opening defined by peripheral edge 28 has a conically inclined convergent surface 34 which forms the entrance to the central coupler 10. An eccentric circumferential groove 36 is provided in sleeves 24 in which is located a spring locking member 38 for releasably securing an optic fiber end coupler 14 as shown.

Referring now to FIGS. 3 and 4, the centering device 12 of this invention comprises a pair of slightly elongated half-round holding members 40 each of which has a flat surface 42 in opposed mating relationship. Each flat surface 42 has an opposed longitudinal V-groove 44 which defines a second bore 46 with a conically inclined convergent surface 48 on either end thereof. As shown, the outer end surfaces of each holding member 50 are tapered inwardly to define the entrance to the centering device.

The half-round holding members 40 are assembled with flat surfaces 42 in opposed mating relationship. This relationship is elastically maintained by two O-rings 52 of any suitable elastomeric material such as polyurethane. Each O-ring 52 is retained in a circumferential groove 54. The centering device 12 may be formed of any suitably rigid material such as a rigid plastic or aluminum.

As shown in FIG. 3, the end of a single optical fiber 56 is inserted into the centering device 12 and thereby half-round holding members 40 are spread slightly apart. The optical fibers 56 are maintained in precise axial alignment within the second bore 46 formed by opposed V-grooves 44 even though they may be of dissimilar diameters because the half-round members 40 are able to "float" with respect to each other. In practice, the centering device is self-aligned and can accommodate optical fibers of dissimilar diameters.

Typically, the pitch angle defined by the opposite walls of V-groove 44 is in the range of 60° to 120°, and preferably is 90°. When the pitch angle is substantially 90°, opposed single optical fibers of circular cross-section are supported, regardless of whether their diameters are the same or different, along four lines of contact spaced 90° apart.

The V-groove geometry, which can be varied for a wide range of optical fiber diameters, is selected so that for a given range of optical fiber diameters, a space in the order of 0.5 to about 6 mils and denoted p in FIG. 5 will be provided between half-round holding members 40 when the ends of two single optical fibers are held in the opposed V-grooves.

The centering device of this invention, when half-round holding members 40 are assembled, has a generally cylindrical body portion, i.e., the surface area confined between O-rings 52. The length L of the body portion, as shown in FIG. 4, is slightly less than the width of hub 22, and the diameter of the body portion is slightly less than the diameter of the hole located in hub 22. The centering device, therefore, can be demountably attached to the central coupler, and O-rings 52 act as retainers to hold the centering device in the hub yet allow for limited pivotal movement.

Referring now to FIG. 2, there is shown an exploded perspective view illustrating a section of a fiber end connector 14 of the type particularly suited for use with this invention. The end connector comprises a retainer sleeve 60, the forward end of which is provided with a conically inclined inwardly converging surface 62. A collet holder 64 is located within the retainer sleeve coaxial therewith and arranged for limited axial movement. The collet holder 64 has an elongated cylindrical body 66, the forward end of which terminates in a plurality of gripping fingers 68 and the rear end of which terminates in a flange 70. The collet holder 64 is provided with a longitudinal passage coaxial with the retainer sleeve 60 and just slightly larger in diameter than the outside diameter of a jacketed optical fiber 72.

Gripping fingers 68 are bowed outwardly as shown, forming a conically included diverging surface which mates with the inwardly converging surface 62 of the retainer sleeeve. The rear portion of the retainer sleeve 60 has an annular cavity 74 in which is located a coil spring 76 with its central axis coaxial with the longitudinal axis of the retainer sleeve. The spring 76 is arranged to exert a force against flange 70 whereby collet holder 64 is urged rearwardly and gripping fingers 68 are simultaneously urged inwardly by the conically inclined converging surface 62 to grip the jacket of an optical fiber 72 as shown.

The fiber end connector further comprises an adjusting sleeve 78 having an enlarged rear portion 80 and a reduced diameter forward portion 86 joined by a conically inclined converging surface 82. Forward portion 86 defines a cylinder 87 having a pair of forwardly projecting opposed guide fingers 88 located on the forward peripheral edge 89 thereof and an annular groove 84 at the rear thereof. Peripheral edge 89 terminates in an inwardly projecting annular ring 90. A second annular ring 92 is formed at the rear of cylinder 87 defining a cavity 91 in which are located a fiber end guide 94, a coil spring 96 and a fiber retention gripper 98.

The fiber end guide 94 comprises a hollow cylindrical body portion 100 having a flat circular base with a centrally located guide hole (not shown). The peripheral edge of the base extends outwardly to form a flange 102. The fiber end guide 94 is slidably mounted in cavity 91.

Fiber retention gripper 98 has a generally cylindrical main body 104 having an axial bore. Body 104 is integrally joined to a pair of opposed grippers 106 defining the frustrum of a cone, the bottom surface of which projects outwardly and mates against second annular ring 92.

A compression spring 96 circumscribes the portion of the cavity 91 between the fiber guide 94 and the fiber retention gripper 98 with one end bearing against the base of the fiber guide and the other end bearing against the tapered surface of the grippers 106. The spring 96 biases fiber guide 94 forward whereby flange 102 mates against forward annular ring 90 while simultaneously exerting a force against the tapered surface of the grippers 106, a component of which urges the grippers inwardly to grip the exposed end of an optical fiber 108.

Retainer sleeve 60 has a main cylindrical body 110, the forward edge of which defines an annular cavity 112 having a plurality of parallel longitudinal shallow grooves 114 spaced along the outer surface thereof. The inner surface has a threaded outside diameter 116.

The enlarged rear portion 80 of adjusting sleeve 78 has a threaded inside diameter 118 arranged to threadingly engage outside diameter 116. The rear portion 80 of adjusting sleeve 78 terminates in a rear peripheral edge of reduced diameter 120 having a cleat 122. When the retainer sleeve 60 and the adjusting sleeve 78 are assembled, cleat 122 engages the shallow grooves 114 and permits a stepwise adjustment of the adjusting sleeve 78 relative to the retainer sleeve 60. By turning the adjusting sleeve 78 relative to retainer sleeve 60, an optical fiber gripped securely in collet holder 66 can be moved axially relative to the adjusting sleeve 78 and thereby the terminal end 124 of an exposed optical fiber can be precisely located relative to fiber guide 94 prior to insertion of the fiber end connector 14 into a central coupler 10.

When inserted into a central coupler 10, the opposed forwardly projecting guide fingers 88 of forward portion 86 located in opposed slots between the ribs 20 of the housing 16. Simultaneously, spring 38, which partially obstructs the entrance to the central coupler, engages annular groove 84, thereby releasably locking the fiber end connector 14 in the central coupling 10.

Referring now to FIG. 6, there is shown a central coupler 10 in which a portion of the outside diameter of sleeve 24 is threaded and includes a forward shoulder 126. The threaded portion of sleeve 24 can be inserted into an appropriate panel mounting hole and secured with a lock washer and retainer nut (not shown), shoulder 126 mating against the panel surface.

Modifications can be made to the central coupler 10 to facilitate a zero-insertion force introduction of the optical fiber through the half round holding members 40. Referring to FIGS. 7 and 8, the zero insertion force is achieved by locating one or more wedges 128 in the space 43 between the two half-round holding members 40'. The wedges 128 exit through the outer wall of the central coupler 1040 as shown in FIG. 7. A shoulder 132 on the wedge 128 prevents it from being pushed through the outer wall of the central coupler 10'. A spring 130 exerts force on the wedge away from the centering device 12'. An O-ring 134 prevents dust from entering the interior of the centering device 12'. By depressing the wedges 128, simultaneously in the direction of the axis of the central coupler 10', the wedges 128 interpose between the flat surfaces 42' of the two half-round holding members 40'. The outward movements of the holding members 40' is restrained by the two O-rings 52' at the front and back.

As the wedges 128 move between the two flat surfaces 42', sufficient relative movements between the two half-round holding members 40' is generated to facilitate entry of any diameter optic fiber without abrading the fiber. When the wedges 128 are released the spring 130 forces the wedges out from between the flat surfaces 42'. Thereafter the optical fiber is gripped within the V-groove 44' of the central coupler due to the tension of the two O-rings 52'.

The advantages of the above described zero-insertion-force device is two fold. First, it prevents breakage of the optical fiber during introduction into the central coupler 10'. Secondly, it prevents scrapping off and damage to the optical fiber's outer cladding during its passage into the central coupler 10'.

As many widely different embodiments of this invention may be made without departing from the spirit and scope thereof, it is to be understood that this invention is not limited to the specific embodiments thereof except as defined in the appended claims, and all changes which come within the meaning and range of equivalents are intended to be embraced therein.

What is claimed is:

1. An optical fiber connector comprising:
 a housing having a generally cylindrical first bore,
 at least two opposed ribs extending radially into said first bore and terminating in a hub having a hole coaxial with said first bore,
 a pair of sleeves mounted on said housing in opposed relationship, said sleeves terminating in an inwardly projecting peripheral edge defining an opening to said housing coaxial with said first bore, said peripheral edge forming an annular cavity with said housing,
 a resilient O-ring located in said annular cavity having an inside diameter slightly less than said first bore,
 at least one pair of slightly elongated half-round holding members pivotally mounted in said hole, said holding members having a flat surface in opposed mating relationship, said surfaces having an opposed longitudinal V-groove defining a second bore coaxial with said first bore, said second bore having a conically inclined convergent surface on either end thereof defining an entrance to receive the exposed core end of an optical fiber,
 means for guiding the ends of an optical fiber into said second bore, and
 means for elastically maintaining said holding members in opposed relationship.

2. The optical fiber connector of claim 1 wherein said means for guiding the ends of an optical fiber into said second bore comprises a fiber end connector of the type having an elongated hollow cylindrical body with a reduced diameter forward portion and an enlarged rear portion, said forward portion defining a cylinder, having a forward and a rear inwardly projecting annular ring defining a cavity,
 a fiber end guide slidably mounted in the forward portion of said cavity coaxial therewith comprising a hollow cylindrical body portion having a flat circular base, said base having a central guide hole of slightly larger diameter than the outside diameter of the end of an optical fiber,
 a fiber retention gripper comprising a generally cylindrical body portion having an axial bore, a pair of opposed grippers defining the frustrum of a core integrally joined to the forward end of said body, the bottom surface of which projects outwardly to mate against said rear annular ring, and
 a compression spring located between said fiber guide and said fiber retention gripper having one end bearing against the base of said fiber guide and the other end bearing against the conical surface defined by said grippers, said spring biasing said fiber guide against said forward annular ring while simultaneously biasing said grippers inwardly to grip the end of an optical fiber.

3. An optical fiber connector in accordance with claim 1 wherein at least one wedge having first and second ends is mounted within said housing, said first end located at the mating point between said half-round holding members and said second end passing through the said housing, said wedge being enclosed by a resilient body whose normal force urges said wedge away from said half-round holding members, said wedge being capable of moving between said half-round holding members and spreading them apart in response to a force on the second end of said wedge overcoming the normal force of said resilient body.

4. An optical fiber connector in accordance with claim 2 wherein at least one wedge having first and second ends is mounted within said housing, said first end located at the mating point between said half-round holding members and said second end passing through the said housing, said wedge being enclosed by a resilient body whose normal force urges said wedge away from said half-round holding members, said wedge being capable of moving between said half-round holding members and spreading them apart in response to a force on the second end of said wedge overcoming the normal force of said resilient body.

5. An improved optical fiber connector of the type wherein each of the ends of a pair of single cladded optical fibers is inserted into an end coupler and axially aligned in end-to-end relationship by inserting said end couplers into a central coupler of the type having a generally cylindrical first bore, wherein the improvement comprises two half-round holding members mounted in said central coupler, each of said holding members having a flat surface in opposed mating relationship with each other, each of said surfaces having an opposed longitudinal V-groove defining a second bore coaxial with said first bore, said second bore having a conically inclined convergent surface on either end thereof for receiving and guiding the exposed end of an inserted fiber into said second bore whereby the longitudinal axis of said fiber coincides with the longitudinal axis of said second bore, said fiber spreading said holding members away from each other, and means for elastically maintaining said holding members in opposed relationship.

6. An optical fiber connector in accordance with claim 5 wherein at least one wedge having first and second ends is mounted within said end coupler, said first end located at the mating point between said half-round holding members and said second end passing through said end coupler, said wedge being enclosed by a resilient body whose normal force urges said wedge away from said half-round holding members, said wedge being capable of moving between said half-round holding members and spreading them apart in response to a force on the second end of said wedge overcoming the normal force of said resilient body.

* * * * *